Feb. 29, 1944. T. G. WEIHS 2,343,035
APPARATUS FOR SCORING COVER GLASS
Filed Dec. 16, 1941 4 Sheets-Sheet 1
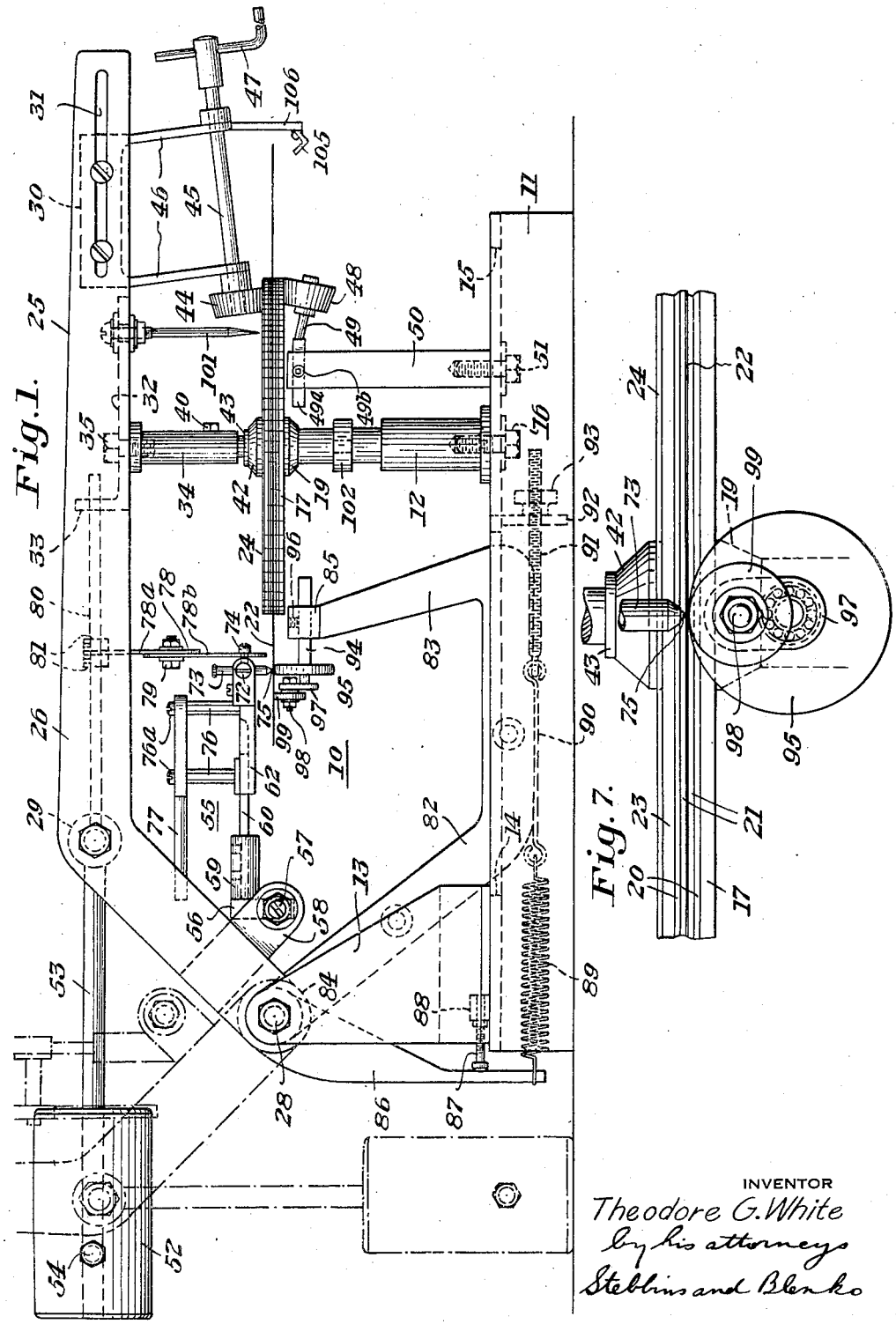
INVENTOR
Theodore G. White
by his attorneys
Stebbins and Blenko Feb. 29, 1944.  T. G. WEIHS  2,343,035
APPARATUS FOR SCORING COVER GLASS
Filed Dec. 16, 1941  4 Sheets-Sheet 2
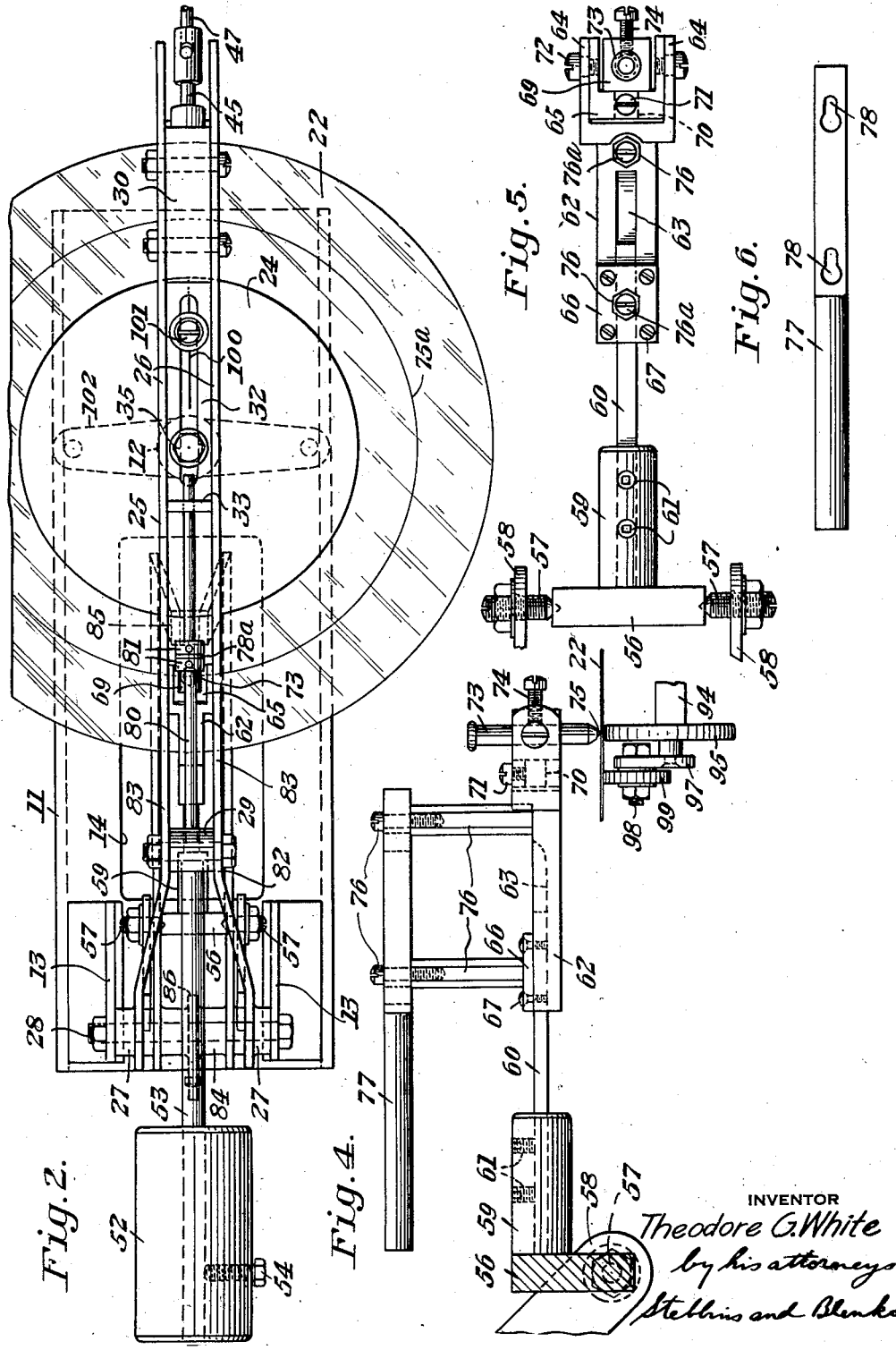
INVENTOR
Theodore G. White
by his attorneys
Stebbins and Blenko

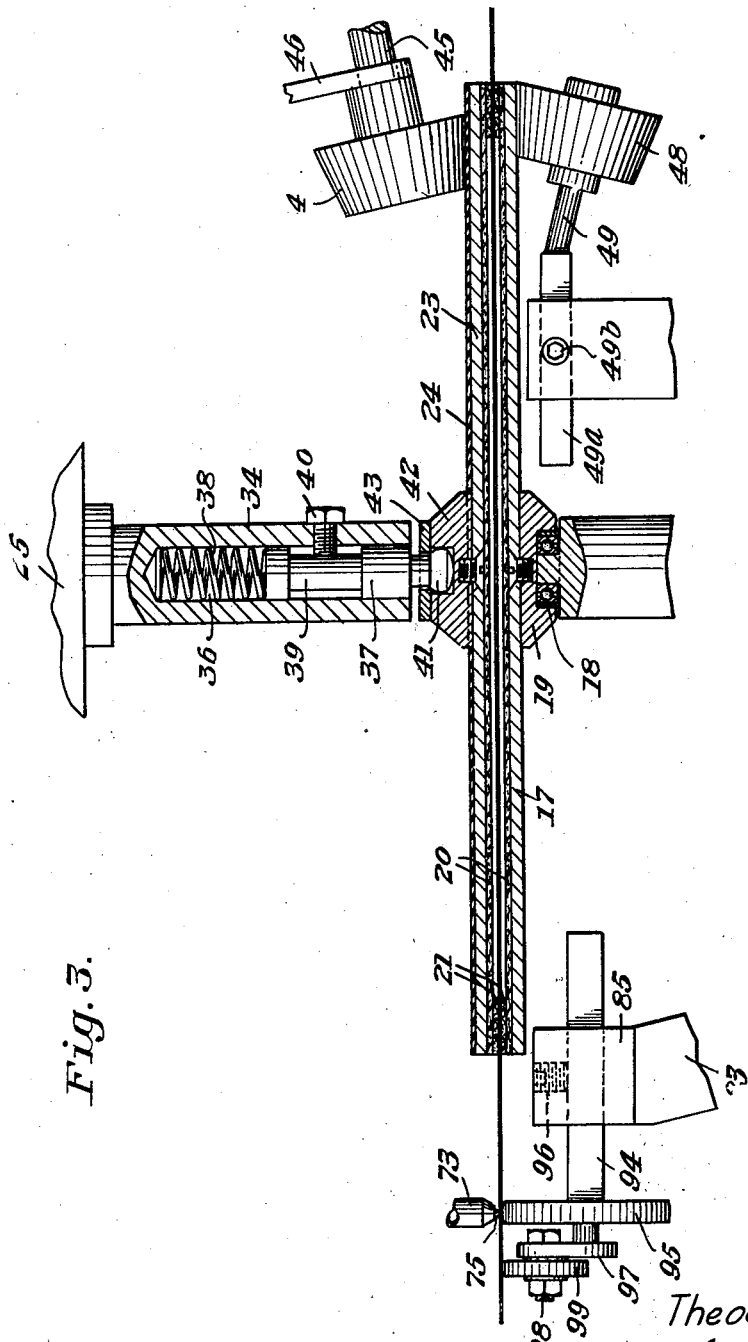

Feb. 29, 1944.  T. G. WEIHS  2,343,035
APPARATUS FOR SCORING COVER GLASS
Filed Dec. 16, 1941  4 Sheets-Sheet 4
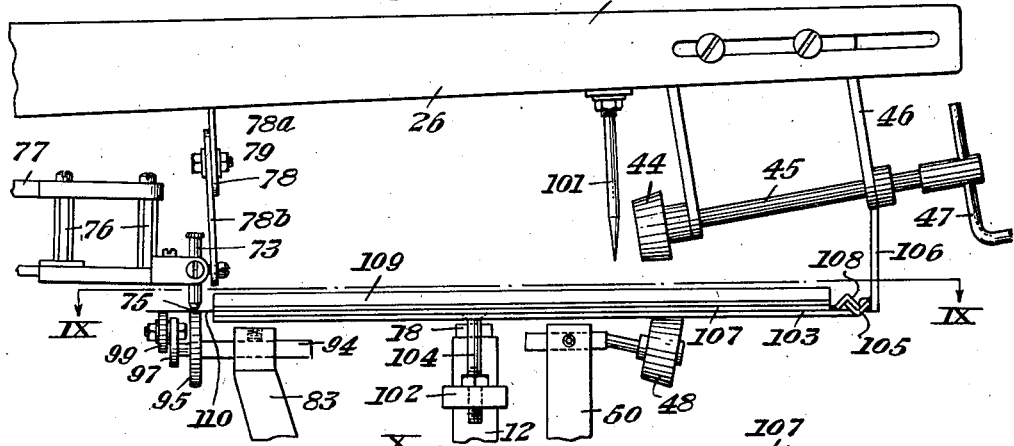
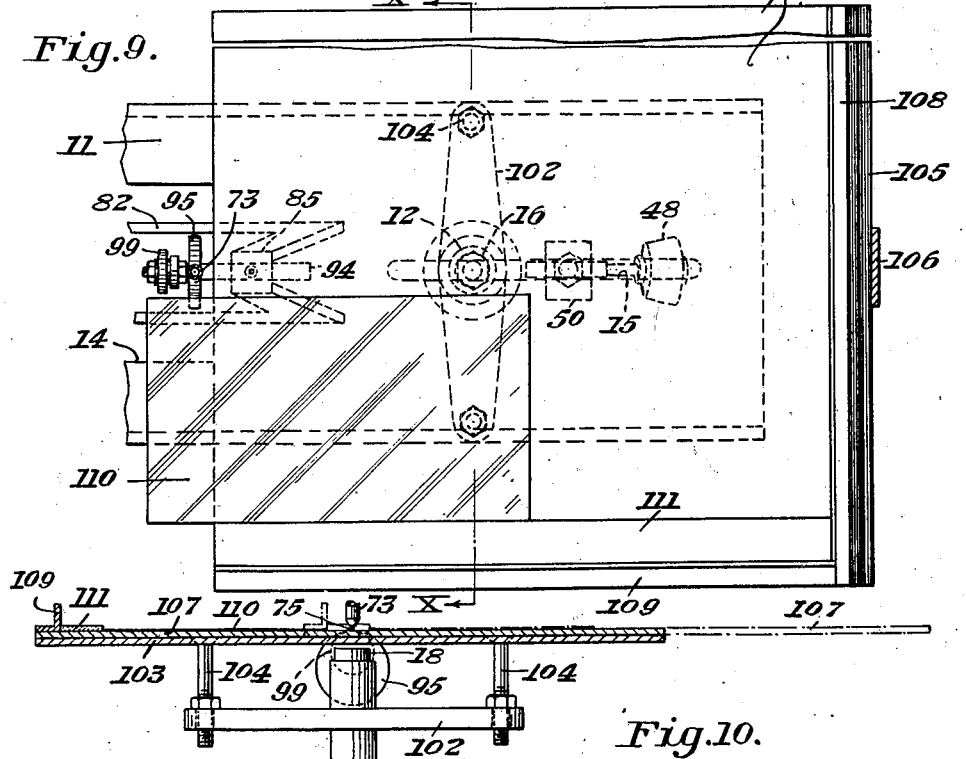
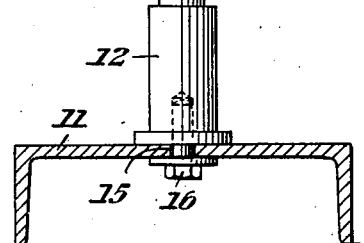
INVENTOR
Theodore G. White
by his attorneys
Stebbins and Blenk Patented Feb. 29, 1944

2,343,035

UNITED STATES PATENT OFFICE 2,343,035

APPARATUS FOR SCORING COVER GLASS

Theodor G. Weihs, now by legal change of name Theodore G. White, Pittsburgh, Pa., assignor to American Window Glass Company, Pittsburgh, Pa., a corporation of Pennsylvania Application December 16, 1941, Serial No. 423,168

10 Claims. (Cl. 33—27)

The present invention relates to the severance of glass sheets and more particularly to a novel method and apparatus for effecting the scoring operation. The method and apparatus provided by my invention may be used in the scoring of plate glass, sheet glass, and so-called cover glass which is an extremely thin product. While the apparatus disclosed herein was designed primarily for scoring cover glass, it and the principles embodied therein may be employed to advantage in the scoring of ordinary sheet glass as well as other types of glass with better results than are obtainable with the previously known scoring machines because a score of uniform depth can be obtained thereby.

Glass-scoring machine of various types have been used heretofore but all of those with which I am familiar have been objectionable because they do not provide a score or cut of uniform depth with the result that a substantial amount of breakage is encountered in the subsequent severance of the parts of the scored sheet. This objectionable feature has been particularly prevalent in the severance of the thinner glass sheets such as single-strength sheet glass, lantern-slide glass, microscopic plates, and cover glass. While various types of glass-scoring machines have been used commercially in the severance of single-strength sheet glass, an excessive amount of breakage has been experienced. Moreover, so far as I am aware, it has not been possible to use such scoring machines with any degree of satisfaction in the cutting of the thinner products. This is particularly true in the case of cover glass which has heretofore been cut to desired sizes and shapes by hand.

While the present invention is not limited to the severance of cover glass, for convenience the invention will be described herein as applied thereto.

Cover glass is an extremely thin product ordinarily running from approximately .005" to .007" in thickness. The scoring thereof is quite a delicate operation because of this extreme thinness and the fragility of the material. The pressure on the scoring tool must be maintained substantially constant within relatively narrow limits to prevent irregular shattering instead of a smooth break. The maintenance of a substantially constant pressure is rendered quite difficult due to irregularity in the surface condition of the bubble from which the glass is cut. I have found that an appropriate and substantially constant pressure can be effected by the use of a "floating" scoring tool which is caused by gravity to exert the proper uniform pressure on the glass. Such scoring tool will accurately follow the irregularities in the glass and will produce a cut or score of uniform depth.

In the preferred practice of my invention I support a glass sheet with both surfaces of the area to be scored exposed. The scoring tool is applied to one surface under a predetermined constant pressure and a yielding force is applied to the other surface in opposition to the force exerted by the scoring tool. As a result, the scoring tool "floats" on the surface of the sheet to be scored and accurately follows any irregularities or wavy condition of the surface, making a score or cut of uniform depth in all portions, whether high or low.

A preferred form of the apparatus comprises a support for sheet glass which may either be in the form of a turn table or a plate sliding on a platen. The scoring-tool mounting is spaced from the edge of the table or platen for engagement with one surface of the projecting edge of a glass sheet thereon. A spring-urged suspension lever carries a roller engaging the other surface of the sheet opposite the point engaged by the scoring tool, to exert a yielding pressure on the sheet to sustain the force of the tool. In order to insure that the tool exerts a constant pressure at all times, I utilize a movable tool mounting urged into engagement with the sheet solely by gravity. With this arrangement, I am able to vary the force exerted by the tool by adjusting counter-weights or replacing removable parts of the mounting. Thus a particular feature and novelty characterizing my invention is the use of a scoring tool actuated exclusively by gravity. Other features include a clamping disc cooperating with the turn table and means for driving the table when it is desired to score a disc, for example, of cover glass and the provision of means for making a rectilinear as well as an arcuate score on a glass sheet.

The invention will be explained in detail by reference to the accompanying drawings illustrating the preferred form of the apparatus and a modification. In the drawings, Figure 1 is a side elevation of a sheet-glass scoring machine according to the invention;

Figure 2 is a plan view thereof;

Figure 3 is a partial central longitudinal section with parts in elevation;

Figure 4 is a side elevation, with parts in section, to enlarged scale showing a portion of the apparatus;

Figure 5 is a plan view of the parts shown in Figure 4, one part being removed;

Figure 6 is a plan view of the part shown in Figure 4 which is omitted from Figure 5;

Figure 7 is a partial side elevation showing certain parts illustrated in Figure 4 as well as the turn table and clamping disc;

Figure 8 is a side elevation of a modification;

Figure 9 is a plan view thereof with parts in section on the plane of line IX—IX of Figure 8; and Figure 10 is a transverse sectional view taken along the plane of line X—X of Figure 9.

Referring now in detail to the drawings and, for the present, to Figures 1 through 3, the glass-scoring machine of my invention indicated generally at 10 includes a base 11, conveniently a suitable length of channel iron, having a bearing post 12 adjacent one end thereof and spaced bearing standards 13 adjacent the other end. Adjacent the standards 13, an opening 14 is formed in the top of the base 11, i. e., the web of the channel iron. A central longitudinal slot 15 is also formed in the top of the base. The post 12 is secured to the base by a screw 16 passing through the slot and is adjustable along the base on loosening the screw.

A support for glass sheets in the form of a disc or table 17 is mounted for rotation on a bearing 18 seated on the upper end of the post 12. The table 17 is secured by a central screw to a hub 19 adapted to receive the bearing 18. The table 17 is covered with a layer of sheathing 20 which may be of any suitable material such as cork or the like. A ring 21 of resilient material such as felt extends around the periphery of the table on top of the sheathing layer 20.

I provide means for holding a glass sheet 22 on the table 17 and means for rotating the table and the sheet to produce a circular score on the latter. The means for holding the sheet on the table comprises a clamping disc or plate 23 which is also provided with a sheathing layer 20 and an annular ring 21 of felt or the like on the lower surface thereof. The upper surface of the disc 23 is provided with a sheathing layer 24 of rubber or other suitable frictional material.

The disc 23 is mounted for rotation and for movement into and out of cooperation with the table 17, on an arm 25. The arm 25 comprises a pair of spaced bars 26 having hubs 27 adapted to receive a hinge bolt 28 extending through alined holes in the bearing standards 13. The bars 26 are maintained in properly spaced relation by a spacer sleeve 29 and a spacer block 30 having bolts therethrough. The bolts through the block 30 pass through alined slots 31 near the outer ends of the bars 26. The block is thus adjustable along the arm 25 for a purpose which will appear shortly. A web plate 32 having an upturned portion 33 extends between the bars 26 and is secured thereto at a position spaced from the outer ends thereof. A bearing post 34 is secured to the plate 32 by a screw 35. The post has an axial bore 36 extending thereinto from the lower end adapted to receive a bearing stud 37 slidable therein. A compression spring 38 is disposed between the stud 37 and the upper end of the bore 36. The limits of movement of the stud 37 in the bore are determined by a central portion 39 of reduced diameter and a screw 40 threaded into a radial hole in the post 34.

The stud 37 has an enlarged head 41 received in a suitable recess in a hub 42 to which the clamping disc 23 is secured by a central screw. A keeper washer 43 has a slot dimensioned to receive the reduced neck of the stud 37 above the head 41 and is welded to the hub 41 after being slipped into position. By this construction, the clamping disc 23 is rotatable on the stud 37 and the latter is reciprocable to a limited extent in the bearing post 34.

It will be apparent that with the parts in the position illustrated in Figures 1 and 3, the clamping plate 23 exerts a pressure on the glass sheet 22 determined by the strength of the spring 38.

The means for driving the table 17 and plate 23 comprises a friction roll 44 preferably provided with a rubber or similar surface on its periphery adapted to make good frictional contact with the rubber sheathing layer 24 on the plate 23. The roll 44 is carried on a shaft 45 journaled in bearing brackets 46 depending from the block 30. A crank 47 on the shaft 48 permits the latter to be turned conveniently by hand to rotate the table 17 and plate 23. The adjustability of the block 30 by means of the slots 31 permits the driving roll 44 to be positioned at various distances from the common axis of the posts 12 and 34 to accommodate supporting tables and clamping plates of various diameters.

A supporting roll 48 is journaled on a shaft 49 carried on a post 50. The shaft 49 has a portion 49a square in section, received in a similarly shaped hole in the post 50 and adjustably secured therein by a headless set-screw 49b. The post 50 is secured to the base 11 by a screw 51 passing through slot 15. The roll 48 engages the periphery of the table 17 and supports the latter against the downward force exerted thereon by the roll 44. It will be apparent that the engagement of the latter with the plate 23 determines the operating position of the arm 25.

In order to limit the pressure exerted by the roll 44 on the plate 23, I provide a counter-weight 52 which is adjustable along a rod 53 extending rearwardly of the arm 25 and seated in a suitable recess in the spacer sleeve 29. The weight 52, when secured in adjusted position by a screw 54 offsets the moment of the arm 25 and its associated parts except for the force which it is desired that the roll 44 exert on the plate 23 in order to obtain good driving engagement. Figure 1 illustrates in chain lines, the positions of the arm 25 and counter-weight 52 when the former is upraised to remove the plate 23 from the table 17 for the purpose of applying a sheet to the table or removing it therefrom.

As shown in Figures 1, 2 and 3, the edge of the glass sheet 22 extends beyond the peripheries of the table 17 and the plate 23, both surfaces of the edge of the sheet being thus exposed. According to the invention, I score the glass in the exposed region thereof and along a line spaced from the ears in which the sheet is rigidly supported by the table 17 and plate 23. To this end, I provide a scoring-tool mounting or assembly indicated generally at 55 which is best shown in Figures 4 through 6. As there illustrated, the mounting or assembly is carried on a block 56. The block is pivotally supported by pins 57 threaded through lugs or ears 58 extending downwardly from the bars 26 adjacent the hinge bolt 28. A sleeve 59 extending laterally from the block 56 adjustably receives a bar 60 and is provided with headless set screws 61 for clamping engagement therewith. A tool holder 62 has a slot 63 in one end and is machined at the other end to form spaced sides 64 adapted to receive a tool socket 65. The bar 60 extends into the slot 63 and is secured thereto by a clamping plate 66. The clamping plate is secured to the holder by screws 67. The socket 65 is recessed as at 68 to receive a tool block 69. The block has a stud 70 extending into a hole in the socket 65 and secured therein by a set screw 71. The socket 65 is supported for angular adjustment on bearing screws 72. A tool post 73 extends through a suitable hole in the block 69, is secured therein by a screw 74 and is provided with a diamond point 75. By virtue of the stud 70 and bearing screws 72, the post 73 is capable of universal adjustment. It is also adjustable vertically in the block 69 on loosening the screw 74. It will be understood that the adjustment of the socket 65 on the screws 72 requires that the latter be backed off. When again tightened, they lock the socket in adjusted position.

Posts 76 extend upwardly from the plate 66 and holder 62 and have screws 76a threaded into the upper ends thereof adapted to receive a removable weight bar 77. Key-hole slots 78 in the weight bar facilitate the attachment and removal thereof.

Since the entire assembly or tool mounting 55 is pivoted on the pins 57, the pressure exerted by the point 75 of the scoring tool 73 is determined by the moment of the weight of the assembly by its effective lever arm about the pins 57. Thus by providing a plurality of weight bars 77 varying slightly in length, I can readily adjust the pressure of the scoring tool. Instead of using removable weight bars, I may employ small counterweights adjustable along the laterally projecting portion of the weight bar.

Since the scoring-tool mounting 55 is carried on the arm 25, it swings upwardly with the latter. To maintain the mounting in approximately its normal position relative to the arm 25, I provide a guard 78. This comprises a pair of slotted straps 78a and 78b adjustably secured together by a bolt 79 and suspended from a bar 80 extending between the spacer sleeve 29 and the upturned portion 33 of the web plate 32. As shown, the strap 78a is secured between clamping collars 81 on the rod 80, having set screws engaging the latter. The strap 78b has a hole in the lower portion thereof adapted to receive the screw 74 with ample clearance for all normal movement of the scoring tool caused by irregularities in the surface of the glass sheet being scored. When the arm 25 is upraised, however, the screw 74 is engaged by the side of the hole in the strap 78b and the entire assembly 55 is caused to move with the arm 25.

Since the overhanging edge of the sheet 22 engaged by the point of the scoring tool 73 is at a distance from the supporting table 17 and clamping disc or plate 23, I provide a floating support or suspension adapted to engage the under-surface of the sheet opposite the point engaged by the tool. An arm 82 comprises a pair of bars 83 secured at one end to a hub 84 rotatable on the hinge bolt 28. The other ends of the bars are secured to a block 85. A tail-piece 86 extends downwardly from the hub 84 and is normally urged against a stop in the form of an adjustable screw 87 threaded in a block 88 extending between the bearing standards 13. The tail-piece is held against the stop by the tension spring secured at one end to the extreme end of the tail-piece. The other end of the spring is connected by a link 90 to an adjusting screw 91. The screw 91 is threaded through a web 92 extending transversely between the sides or flanges of the base 11. The screw has a locking thumb nut 93 to hold it in adjusted position.

The block 85 is bored to receive a shaft 94 having a roller 95 journaled thereon. The shaft is held in properly adjusted position by a headless set screw 96. The shaft 94 also carries a disc 97 fixed thereon. A stub shaft 98 secured to the disc 97 carries an auxiliary roller 99. As previously stated, the roller 95 supports the edge of the sheet 22 against the pressure exerted thereon by the scoring tool. The roller 99 supports the annular outer edge of the sheet after severance thereof from the main body of the sheet.

In using the scoring device of my invention to cut a circular disc from a glass sheet, the sheet is placed on the table 17 while the arm 25 and associated parts are in upraised position. The arm 25 is then moved downward to the position shown in solid lines in Figure 1 with an index line 100 on the rubber layer 24 of the plate 23 in line with an index pointer 101 secured to the web plate 32 and depending therebelow. As the plate 23 engages the glass sheet, the stud 37 is arrested but further downward movement of the arm 25 is continued by compression of the spring 36 until the roll 34 engages the clamping arms. As the arm 25 is lowered, the point of the scoring tool 73 engages the upper surface of the sheet. The supporting roller 95 engages the roller surface of the sheet opposite the scoring tool and, after proper adjustment of the screw 91, exerts an upward pressure on the edge of the sheet substantially equal to the downward pressure of the scoring tool. The apparatus is now in position to make a circular score on the sheet 22. This is accomplished by turning the handle 47 which rotates the roll 44 and drives the plate 23 and disc 17 through friction. The resulting rotary movement of the sheet 23 past the point of the scoring tool forms a circular score about the edge of the sheet.

When a complete revolution of the table 17 and clamping plate 23 has been effected, as will be indicated by the return of the index line 100 into alinement with the pointer 101, the operation of the crank 47 is terminated to prevent multiple scores. When a complete score has been made, the annular outer portion of the sheet may easily be severed by slight tapping, if it does not break free during the course of the scoring.

While I have illustrated the device in connection with the scoring of flat glass, it is particularly useful in the scoring of the bottoms of cover glass "caps" made as above described, to facilitate the removal of the thin bottom membrane of the cap from the portion of the side walls of the flask as part of which it is blown. In using the device for this purpose, the cap is placed over the table 17 and is then engaged by the clamping device 23 after which the scoring is carried out in the manner just explained. The device is particularly suited for this purpose because the mounting of the scoring tool causes it to exert a highly uniform pressure on the glass at all times, despite irregularities or a wavy condition in the surface thereof. At the same time, the supporting roller 95 sustains the actual load of the scoring tool assembly on the edge of the sheet regardless of slight variations from a true planar condition. The net result is that the scoring tool and supporting roller "float" with the sheet edge depending upon the level of the latter at various points therearound.

The invention may be adapted for rectilinear scoring by the arrangement illustrated in Figures 8 through 10. As there illustrated, a cross-arm 102 permanently secured to the post 12 supports a table or platen 103 by means of studs 104. An angle bar 105 is carried on a hanger 106 depending from one of the brackets 46. The angle bar 105 engages the side edge of the platen 103 when the arm 25 is lowered to scoring position. A slide plate 107 has an angle bar 108 attached to the side edge thereof which cooperates with the angle bar 105, as shown in Figure 8, to guide the slide plate 107 for rectilinear movement over the platen 103.

The slide plate 107 is provided with an angle 109 effective to position a sheet such as indicated at 110 for scoring by the tool 73 on movement of the slide plate. A filler strip 111 of glass or other material may conveniently be disposed between the angle 109 and the glass sheet 110.

In using the modified form of the apparatus shown in Figures 8 through 10, the glass sheet 110 is placed on the slide plate 107 with its edge overhanging the edge of the plate, as shown in Figure 9 and in position to be engaged by the point of the scoring tool 73. The slide plate is preferably retracted i. e., moved toward the left beyond the position which is illustrated in Figure 10, to facilitate the placing of the sheet. The slide plate is then moved manually toward the scoring tool. The latter is preferably lifted manually until the leading edge of the sheet passes thereover. When the scoring tool assembly has been released, the glass sheet is scored rectilinearly by continued movement of the slide plate 107 to the position, for example, shown in chain lines in Figure 10. During movement of the slide plate, the roller 95 supports the overhanging edge of the glass sheet beneath the point of the scoring tool in the same manner as in the device of Figures 1 through 7. The scoring tool and roller 95 float as before and accommodate themselves exactly to the edge of the glass sheet, regardless of the irregularity or wavy condition thereof.

The portions of the structure shown in Figures 8 through 10 which are designated by the same numerals as in Figures 1 through 7 are identical with the corresponding parts of the latter.

It will be apparent from the foregoing description and explanation that the invention is characterized by numerous advantages over scoring machines and methods known heretofore. In the first place, the invention is particularly adapted for scoring cover glass and, more especially, the cutting out of the thin membrane formed in the bottom of the bubble on twirling, in the manufacture of cover glass. It is applicable as well, however, to rectilinear scoring for general purposes. The invention is not limited, furthermore, to cover glass but may be employed for the scoring of sheets having a thickness many times that of ordinary cover glass. An important advantage of the invention has already been alluded to, viz., the floating mounting of the scoring tool and the support for the overhanging free edge of the glass sheet which sustains the pressure of the tool. In addition, the apparatus is simple in construction and operation so that it may be manufactured at relatively low cost and does not require any particular skill in its use.

A further advantage is that the scoring tool, being actuated solely by gravity, exerts a constant pressure on the glass at all times, resulting in a highly uniform scoring thereof.

Although I have illustrated and described but a preferred embodiment and practice of the invention with a modification thereof, it will be recognized that changes in the construction and arrangement of the parts and the practice disclosed may be made without departing from the spirit of the invention or the scope of the appended claims.

I claim:

1. Apparatus for scoring glass comprising a base, a turn table rotatable thereon, an arm pivoted on said base and overhanging said turn table, a clamping disc on said arm adapted to engage a glass sheet on said turn table, and a scoring tool mounted on said arm and adapted to engage said sheet.

2. Apparatus for scoring glass comprising a base, a turn table rotatable thereon, a scoring tool mounted to engage the overhanging edge of a glass sheet on said table, an arm pivoted on said base and means on said arm supporting said edge against the pressure of said tool.

3. Apparatus for scoring glass comprising a base, a turn table rotatable thereon, an arm pivoted on said base and overhanging said turn table, a clamping disc on said arm adapted to engage a glass sheet on said turn table, and a scoring tool pivoted on said arm and adapted to engage said sheet.

4. Apparatus for scoring glass comprising a base, a turn table rotatable thereon, an arm pivoted on said base and overhanging said turn table, a clamping disc on said arm adapted to engage a glass sheet on said turn table, a scoring tool mounted to engage said sheet, a counterbalancing arm pivoted on said base and means on said counterbalancing arm engaging said sheet to support it against the pressure of said tool.

5. In an apparatus for scoring glass, a movable table adapted to support a glass sheet, a clamping plate adapted to engage a sheet on said table, means adapted to engage said plate and move it, a movable common support for said plate and said means, and a yieldable mounting for one of said plate and said means on said common support.

6. Apparatus for scoring glass comprising means for supporting a glass sheet with its edge overhanging said means, a movable mounting for a scoring tool urged toward said edge solely by its own weight, a scoring tool in said mounting engaging one side of the sheet near said edge, a roller for exerting on said sheet edge a force substantially equal and opposite that exerted by said tool, and yieldingly urged mounting means in which said roller is journaled.

7. Apparatus for scoring sheet glass comprising means for supporting a glass sheet in position for scoring with one edge free, a scoring tool spaced from said supporting means and engaging said edge, a movable mount for said tool, a roller supporting the free edge of the sheet adjacent the point of engagement thereof by said tool, and yieldingly urged mounting means on which said roller is journaled.

8. Apparatus for scoring glass comprising a turn table adapted to support a glass sheet, a clamping disc adapted to hold a sheet on said turn table, a scoring tool spaced from the edge of said turn table, and adapted to engage the overhanging edge of a sheet thereon, a roller for exerting a pressure on the sheet opposing that of said tool, a pivoted lever on which said roller is journaled, and means normally urging said lever in such direction as to cause the roller to engage the sheet.

9. Apparatus for scoring glass comprising a turn table adapted to support a glass sheet, a clamping disc adapted to hold a sheet on said turn table, a scoring tool spaced from the edge of said turn table, and adapted to engage the overhanging edge of a sheet thereon, yielding means exerting a pressure on the sheet opposing that of said tool, and friction driving means engaging said disc.

10. Apparatus for scoring glass comprising a base, a table movable thereon, a scoring tool mounted to engage the overhanging edge of a glass sheet on said table, a lever pivotally mounted on said base, a roller on said lever supporting said edge against the pressure of said tool, and means yieldingly urging said lever in such direction as to move said roller against said edge.

THEODOR G. WEIHS.